March 1, 1927.　　　S. M. FAIRCHILD　　　1,619,108

CAMERA

Filed March 1, 1923

Inventor
S. M. Fairchild
By his Attorneys
Cooper, Kerr & Dunham

Patented Mar. 1, 1927.

1,619,108

UNITED STATES PATENT OFFICE.

SHERMAN M. FAIRCHILD, OF NEW YORK, N. Y.

CAMERA.

Application filed March 1, 1923. Serial No. 622,033.

This invention relates to cameras of the class in which the film or plate is housed in a detachable magazine mounted on the camera body, and is changed after each exposure by power-driven mechanism of suitable character. In the present invention the shutter also is "set", for the next exposure, by power-driven mechanism, and my chief object is to provide simple and effective means for insuring harmonious operation of the two mechanisms so that the film or plate will be changed after each exposure in proper time relation to the operation of the shutter. To this end I provide in association with the camera body a primary driving mechanism which may be actuated by a suitable motor, this driving mechanism being connected with the shutter in such manner, as by gearing, that the two are always in time; and in association with the film or plate magazine I provide changing mechanism which is detachably connected with the primary driving mechanism by means of a two-part connecting device so constructed that when the magazine (detached for reloading or for any other purpose) is replaced on the camera the two parts of the connecting device will always re-engage in the proper cyclic relation. The new film or plate is then carried through or into the field of exposure in much the same manner as if it were, in effect a continuation of the former film or plate.

One form of the invention is illustrated in the accompanying drawing, in which

A portion of the camera body is shown at 10, and a portion of the removable film-magazine is shown at 11, the latter being raised slightly to show the clutch members disengaged. Any convenient and suitable means, not shown, may be employed to secure the magazine in position on the camera.

The primary driving mechanism, housed in the camera body 10, is indicated generally by the gearing 12, and is itself driven by a motor, not shown, or by hand by means of a suitable crank, not shown. In the magazine is the film-changing mechanism, indicated generally by the shaft 13, which is driven by the said primary mechanism through the agency of a shaft 14.

Figure 1:
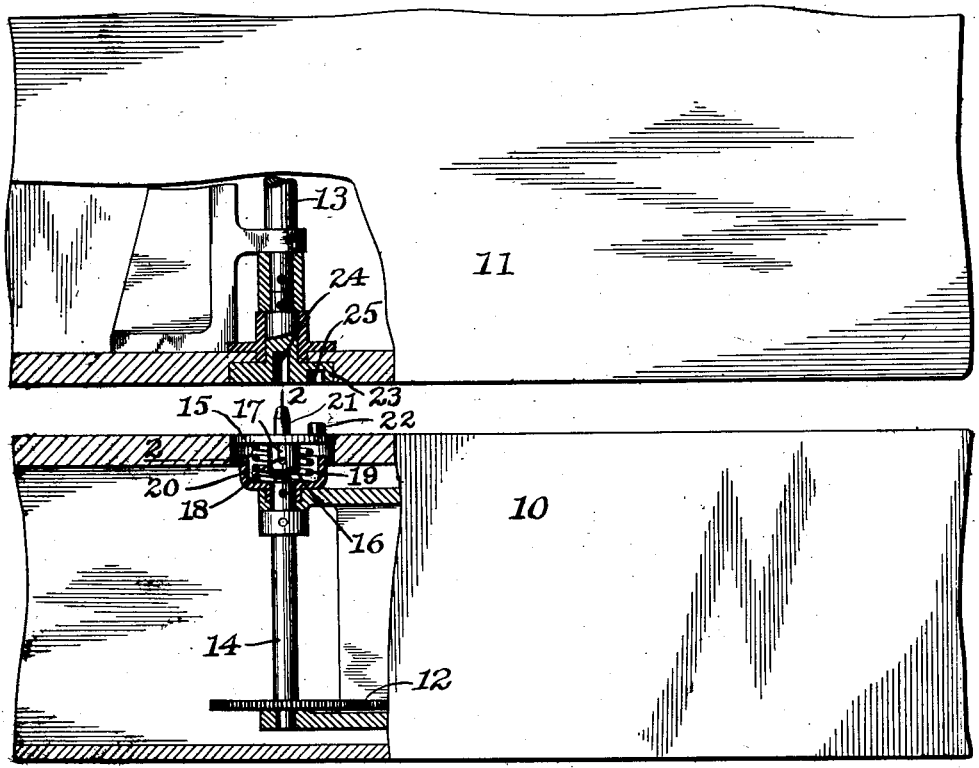
Fig. 1 is a side view of a portion of the camera body and a portion of the magazine, with part of each broken away to show the automatically synchronizing clutch or connecting device.
Figure 2:
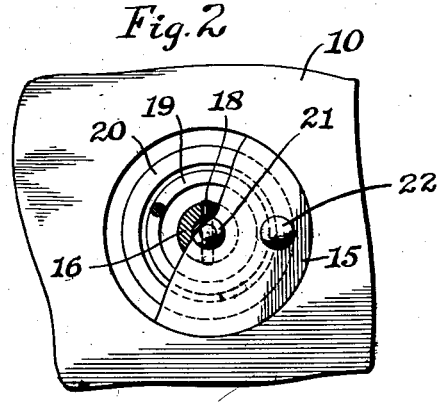
Fig. 2 is a plan view of the driving member of the synchronizing clutch, partly in section, about on line 2—2 of Fig. 1.

When the magazine is in operative position on the camera the two shafts 13, 14 are connected by a clutch which in the preferred form of the invention comprises the following elements or parts. On the outer or upper end of shaft 14 is a clutch disk 15 having a hub 16 provided with diametrically opposite, axial slots, one of which is shown at 17, engaged by a pin 18 extending through the shaft, so that the disk can be shifted axially but must rotate with the shaft, as will be readily understood. A spring 19, housed in a cup 20 carried by the shaft 14, holds the disk yieldingly in its upper position with the top of the disk substantially flush with the top of the camera body 10. As will be seen in Fig. 1, the slot-and-pin construction 17—18 determines the possible upward movement of the disk. The disk is also provided with a centering stud 21 and with a driving stud 22. Fixed on the lower end of shaft 13 is a clutch disk 23, having a centering aperture 24 to receive the stud 21 and a driving aperture 25 to receive the driving stud 22.

From the foregoing the operation of the device will be readily understood. When the magazine is set down on the camera, the centering stud 21 enters the aperture 24, and the driving stud 22 may or may not enter the driving aperture 25. If it does, the two shafts are connected in their normal relation, that is, the film changing mechanism and the primary driving mechanism are synchronized. If the driving stud and aperture do not engage at once, the driving disk 15 is depressed against the tension of the spring 19. Then when the disk 15 begins to rotate, the stud 22 is revolved and finally comes under the aperture 25, whereupon the disk is raised by the spring and the stud is thus shifted into the aperture. The two shafts are then in their normal relation to each other, as before. In short, driving connection between the two shafts is possible at one and only one angular relation between them, and the shaft 14 will never have to make a complete revolution before engagement occurs. In most cases the rotation of the latter shaft is intermittent, that is, it is stopped at the end of each cycle, and preferably makes one complete revolution in each cycle. Hence if the two clutch members do not engage immediately it will only mean that, at most, one more than the usual number of "blank" revolutions of the shaft will have to be made before the first exposure area of the film reaches the exposure field. It will be observed that in order to permit the magazine to be positioned, that is, take its operative position, on the camera body, it is not necessary to have the clutch members "lined up", which would require locking devices to lock the two mechanisms in proper relation to each other whenever the magazine is removed or would require careful "lining up" of the clutch members before the magazine could be placed in operative position. In my construction, however, the magazine and camera body fit together in operative relation even though the two mechanisms are out of synchronism, but when the driving mechanism is started the driving member of the clutch automatically engages the driven member as soon as the driving mechanism has caught up with the driven mechanism. Hence the operator need pay no attention to the relative position of the parts. If he removes the magazine, as for example to substitute a fresh roll of film, he does not have to see that when the substitution is completed the driven member of the clutch is in the same position as when the magazine was removed. The same is true if for any reason it becomes necessary to open the magazine, in the darkroom or elsewhere, before the entire roll is exposed. He can, when the magazine is off, operate the driving mechanism as often as may be desirable, for testing or any other purpose, and having done so he can replace the magazine completely, in operative position, without being obliged to see that any apertures or parts in the driving mechanism are lined up, perhaps cautiously operating the mechanism by hand in order to bring the parts into proper position. These advantages, which are of special importance in changing films in an aerial camera in the course of a flight, when intense cold and other hampering conditions are often encountered, are obtainable without the use of automatic locks or the like, which add complication to the apparatus.

The driving aperture 25 may be slightly larger than the stud 22, to facilitate engagement, or one or both may be slightly tapered for the same purpose. In the latter case the taper should be slight enough, or the spring 19 should be stiff enough, or both, to prevent the driving pressure of the stud on the wall of the aperture from camming the stud down out of engagement.

It is to be understood that the invention is not limited to the details herein specifically described but can be embodied in other forms without departure from its spirit.

I claim—

1. In combination, a camera body, a detachable magazine therefor, and separable driving and driven mechanisms for the camera body and magazine, adapted to be automatically engaged with each other in proper cyclic relation by operation of the driving mechanism when the magazine is replaced on the camera body.

2. In combination, a camera body, a detachable magazine therefor, separable driving and driven mechanisms for the camera body and magazine, and means whereby operation of the driving mechanism automatically establishes the proper cyclic relation between the two mechanisms when the magazine is replaced on the camera body.

3. In a camera, in combination, a camera body, a removable magazine therefor, driving mechanism in the camera body, changing mechanism associated with the magazine to be driven by the first-named mechanism, and a releasable driving connection between said mechanisms adapted to automatically synchronize the two mechanisms after the magazine is positioned on the camera body at any time in the cycle of operation of the camera.

4. In a camera, in combination, a camera body, driving mechanism associated therewith, a removable magazine, changing mechanism associated with the magazine, having an actuating shaft, and an automatically synchronizing clutch releasably connecting the said shaft with the driving mechanism.

5. In a camera, in combination, a camera body, driving mechanism associated therewith, having a driving shaft, a removable magazine, changing mechanism associated therewith, having an actuating shaft, and separable driving and driven clutch-elements carried by said shafts and adapted to automatically engage each other with only one angular relation between the shafts when the magazine is seated on the camera body and the driving shaft is rotating.

6. In a camera, a releasable clutch for operatively connecting driving and driven parts, comprising a driving disk and a driven disk, one having a driving stud and the other an aperture to receive the stud, one of the disks being shiftable axially toward and from the other, and a spring associated with the axially shiftable disk to urge the same toward the other.

7. In a camera, a releasable clutch for operatively connecting driving and driven shafts, comprising a driven disk, a driving disk movable axially toward and from the other, one of said disks having a driving stud and the other an aperture to receive the stud; and a spring associated with the driving disk to urge the same toward the driven disk.

8. In a camera having driving and driven parts, in combination, a driving shaft, a driven shaft, a releasable clutch comprising a driving disk on the first mentioned shaft and a driven disk on the second mentioned shaft, the first mentioned disk having a driving stud and the other an aperture to receive the stud, the disk on the driving shaft being capable of axial movement on said shaft toward and from the other disk, and a spring associated with the axially movable disk to urge the same toward the disk on the driven shaft.

In testimony whereof I hereto affix my signature.

SHERMAN M. FAIRCHILD.